(12) United States Patent
Iroh et al.

(10) Patent No.: US 9,732,235 B2
(45) Date of Patent: Aug. 15, 2017

(54) CORROSION RESISTANT HYBRID SILANIZED EPOXY ESTER RESINS, COATINGS AND SURFACE PRE-TREATMENT FORMULATIONS

(71) Applicant: University of Cincinnati, Cincinnati, OH (US)

(72) Inventors: Jude Iroh, Mason, OH (US); Jaspreet S. Beemat, Maricopa, AZ (US)

(73) Assignee: University Of Cincinnati, Cincinnati, OH (US)

( * ) Notice: Subject to any disclaimer, the term of this patent is extended or adjusted under 35 U.S.C. 154(b) by 220 days.

(21) Appl. No.: 14/734,089

(22) Filed: Jun. 9, 2015

(65) Prior Publication Data

US 2016/0376447 A1 Dec. 29, 2016

Related U.S. Application Data

(60) Provisional application No. 62/027,996, filed on Jul. 23, 2014.

(51) Int. Cl.
| | |
|---|---|
| *C09D 5/08* | (2006.01) |
| *C09D 175/04* | (2006.01) |
| *C23F 11/10* | (2006.01) |
| *C09D 175/02* | (2006.01) |
| *C08K 3/34* | (2006.01) |
| *C08G 18/76* | (2006.01) |
| *C09D 163/10* | (2006.01) |
| *C08G 18/32* | (2006.01) |

(52) U.S. Cl.
CPC ............ *C09D 5/08* (2013.01); *C08G 18/3243* (2013.01); *C08G 18/7671* (2013.01); *C08K 3/346* (2013.01); *C09D 163/10* (2013.01); *C09D 175/02* (2013.01); *C09D 175/04* (2013.01); *C23F 11/10* (2013.01)

(58) Field of Classification Search
CPC ..................................................... C09D 175/02
USPC .......... 106/14.05, 14.13, 14.15, 14.41, 14.42
See application file for complete search history.

(56) References Cited

PUBLICATIONS

Progress in Organic Coatings—Mechanism of Corrosion Protection of Aluminum Alloy Substrate by Hybrid Polymer Nanocomposite Coatings by J. Singh-Beemat et al, available online Jul. 23, 2013, 5 pages.
Effect of Clay on the Corrosion Inhibition and Dynamic Mechanical Properties of Epoxy Ester-Polyurea-Polysiloxane Hybrid Coatings by J. Singh-Beemat et al, published online Nov. 9, 2012 10 pages.
Process and Properties of Hybrid Silane-EpoxyNanocomposite Coatings by J. S. Beemat, full text release Sep. 13, 2014, 2 pages.
The Effect of Morphologyon the Corrosion Inhibition and Mechanical Properties of Hybrid Polymer Coatings by J. Singh-Beemat et al, published online Jul. 26, 2012, 10 pages.

*Primary Examiner* — Marc Zimmer
(74) *Attorney, Agent, or Firm* — Wood Herron & Evans LLP

(57) ABSTRACT

A self-healing coating composition for use on metals includes a polyurea, an epoxy ester unsaturated resin, a combination of amine terminated siloxane and epoxy terminated siloxane and an organoclay. The polyurea is a water-soluble, aromatic polyurea and likewise, the epoxy ester is a water-soluble, aromatic epoxy ester. The coating composition is formed in a non-volatile solvent, such as N-Methylpyrrolidone. It can be applied to a metal surface and cured at room temperature to form a coating that is resistant to corrosion. Further the coating self-heals in a manner similar to a chromate coating.

18 Claims, No Drawings

CORROSION RESISTANT HYBRID SILANIZED EPOXY ESTER RESINS, COATINGS AND SURFACE PRE-TREATMENT FORMULATIONS

PRIORITY CLAIM

This application is based on, and claims benefit to, provisional patent application Ser. No. 62/027,996 filed Jul. 23, 2014, the disclosure of which is incorporated herein by reference in its entirety.

GOVERNMENT GRANT SUPPORT CLAUSE

This invention was made with government support under Contract No. N00014-09-1-0980 awarded by the Office of Naval Research, as well as under Contract No. CMMI-0758656 awarded by the National Science Foundation. The government has certain rights in the invention.

BACKGROUND OF THE INVENTION

The regulation of chromium in the coating systems has created a new challenge for the coating technologists. State of the art chromate conversion coatings protect metal substrates, due to the ability of highly mobile hexavalent chromium to travel to sites of corrosion and reduce itself to trivalent chromium and adsorb irreversibly on the metal surface to inhibit cathodic and anodic reactions. Unfortunately the same ability of hexavalent chromium to reduce trivalent chromium leaves some molecular debris from transition steps that induce the critical changes in DNA which leads to lung cancer.

Researchers have taken various routes to make safer self-healing coatings. One route employs compounds similar to chromium such as molybdenum, cerium and vanadium. But the corrosion inhibition efficiency of these compounds is far less than chromium. Another approach relies on the encapsulation of reactive resins in the coatings. The reactive resins are contained in capsules which rupture with mechanical or pH stimulus and release the reactive resin that cures on contact with either a cross-linker or a catalyst. The cross-linker or catalyst is usually mixed previously in the matrix itself or can be contained in separate capsules, which are dispersed in the matrix.

This approach of incorporating capsules in the coatings also comes with its own limitations. Other than the effect on mechanical and physical properties of the coating, the low probability of presence of both reactants at the same time and in the required ratio at the damage site is a hindrance to successful usage of this technology.

SUMMARY OF THE INVENTION

The present invention provides a self-healing coating for metals. A hybrid coating formed from epoxy ester, polyurea, amino and epoxy terminated siloxanes and clay provides corrosion protection of metals such as aluminum and its alloy as well as on low carbon steel and other ferrous metals. The corrosion resistance increases with time.

Further, the present invention provides a method of forming a self-healing coating composition which includes taking the polyurea dispersed in a non-volatile organic solvent and combining that with clay and subsequently adding the epoxy silane. After thorough mixing, the amino silane is added, followed by the epoxy resin. Again, after thorough mixing, the coating composition can be applied to metal surfaces to provide corrosion resistance after it has been cured by, for example, increased temperature of about 100 to 125° C.

The objects and advantages of the present invention will be further appreciated in light of the following detailed description.

DETAILED DESCRIPTION OF THE PRESENT INVENTION

The present invention is a coating composition comprising an epoxy ester unsaturated resin, a polyurea, amine terminated siloxane, an epoxy terminated siloxane and an organoclay compound. The cured coating inhibits corrosion on metal surfaces including aluminum, aluminum alloys, iron and iron alloys, in particular, steel alloys.

The epoxy ester resin is a water soluble aromatic unsaturated epoxy resin formed from the reaction of an aromatic di-epoxide with an unsaturated fatty acid. The unsaturated fatty acid can be, for example, a C15 to C18 fatty acid.

The epoxy ester resin is formed by reacting the epoxy groups with the carboxylic acid of an unsaturated fatty acid. A schematic of the formation epoxy ester resin is shown below in which the base epoxy is reacted with unsaturated fatty acids to generate epoxy ester. R represents the aliphatic chain of the fatty acid. In this example, the epoxy is a bisphenyl di-epoxide which in turn forms a resin having two epoxy ester groups, a plurality of aromatic rings and two double bonds.

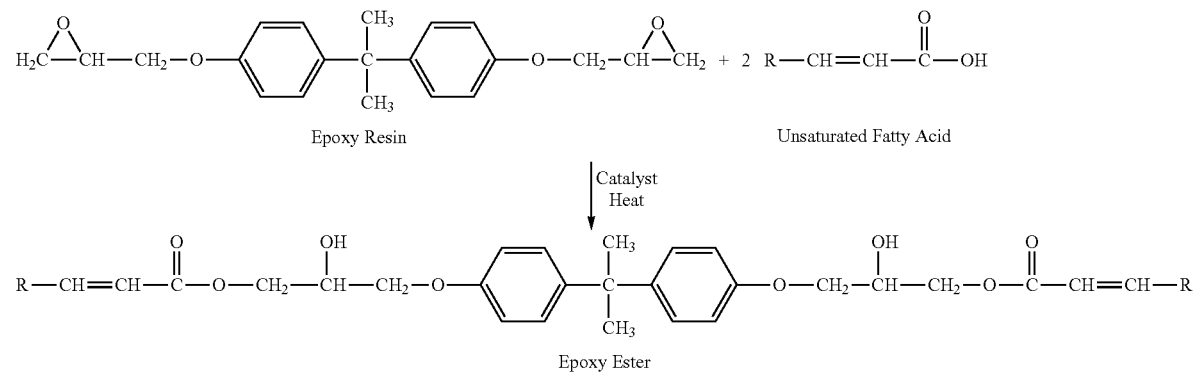

Epoxy Ester
Chemical structure of epoxy ester, where R is the aliphatic chain.

The coating composition will generally contain at least about 20 to about 50% of the epoxy ester and, preferably 30 to about 45%, and in one formulation 39% by weight. Fatty acid terminated epoxy esters can be purchased from Cytec Surface Specialties The present invention will further include a polyurea, preferably a water dispersible aromatic polyurea. Preferably, the polyurea will have a molecular weight of 5000 to about 20,000, generally about 10,000 and an intrinsic viscosity of 0.05 to 0.21. One such polyurea is shown in the following formula below, which is formed from the reaction product of 4,4'-oxydianiline (ODA) reacted with 4,4'-methylenebis (phenyl isocyanate) (MDI). In the formulation, n is an integer from about 4 to about 8.

Generally, the formulation will include at least about 30% to about 50% of the polyurea, more particularly 35 to 45% by weight and in one embodiment 40%. Generally the ratio of the polyester to polyurethane by weight can be 30:70 to 70:30; 40:60 to 60:40 and generally 50:50.

eral, some tetravalent Si atoms in the tetrahedral sheet are partly replaced by trivalent atoms such as Al. Also, in the octahedral sheet, some trivalent Al atoms are replaced by divalent atoms such as Mg, Fe, Cr, Zn etc. This results in a deficit of positive charge or an excess of negative charge being imparted to the clay platelet. This negative charge is compensated by adsorption, on the clay surface, of cations such as $Na^+$ and $Ca2^+$. In the presence of water solution, these cations can be exchanged for others that are present in the solution. This property of aluminosilicate clay is used to treat the surface of the clay with organic cations, to make it compatible with an organic phase, such as a polymer. Several types of commercial organoclay are available. The main difference among them is the organic modifier, whose organic cations can replace the sodium cations on the clay surface.

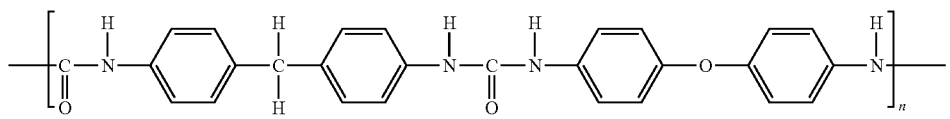

Generally, the formulation will include equimolar amounts of epoxy terminated siloxane and amine terminated siloxane which form 10 to about 30% and preferably 15 to 25% or 20% of the formulation. Below shows an amine terminated siloxane and an epoxy terminated siloxane as well as the theoretical reaction product of the two.

One such clay is 15A cloisite clay. 15A cloisite clay is natural montmorillonite clay which is modified with 2M2HT: dimethyl, dihydrogenated tallow, quaternary ammonium (FIG. 5). The HT, or hydrogenated tallow, contains (~65% C18; ~30% C16; ~5% C14).

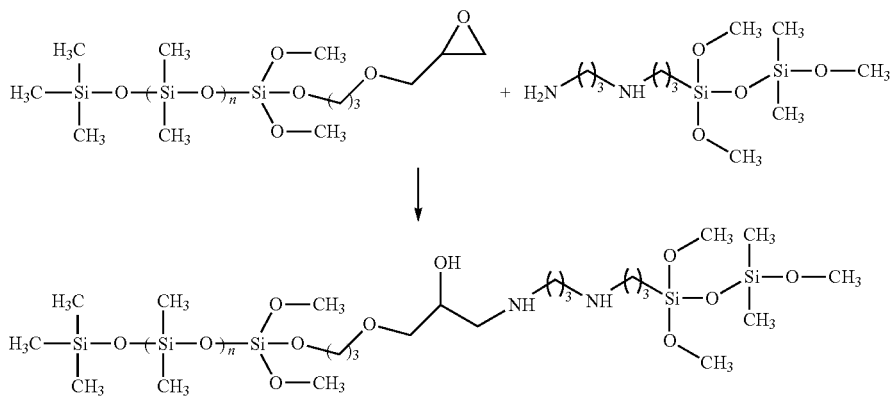

The coating composition will further include an organic clay which will improve corrosion resistance and tensile strength. Any clay which is compatible with the present resin system will function in the present invention. In particular, a montmorillonite clay is particularly suitable in the present invention.

The clay particles are bundles of such platelets that are roughly 1 nm in thickness and 100-1000 nm in breadth. For example, an 8 μm clay particle has approximately 3000 platelets of 1 nm thickness and 200 nm in lateral dimensions. In montmorillonite clay, which is an aluminosilicate min-

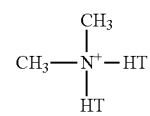

Organic modifier for 15A Clay

Clay should be added in an amount from about 0.1 to about 10%, more preferably from about 0.5 to 5% and generally 0.75 to 2%. One formulation includes 1% by weight clay.

The coating composition is formed in a non-volatile, organic solvent which is effective to dissolve the resin system of the present invention. In particular, N-methylpyrrolidone is a adequate solvent.

The coating formulation is prepared by mixing the respective components. Specifically, the polyurea is dispersed in a non-volatile organic solvent as defined by Federal Regulations. Suitable solvents include N-Methylpyrrolidone. The polyurea is combined with the solvent, for example, NMP, and mechanically stirred for 10 minutes. 15A clay is added next and after half an hour of mechanical stirring, the epoxy siloxane is added. After 10 minutes of additional stirring, the amino siloxane is added to the solution during continued stirring. After another 10 minutes of stirring, the epoxy ester unsaturated resin is added drop wise with high speed stirring continued for additional 2 hrs. Then the solution is ultrasonicated for half an hour. The coating can be applied to a metal surface and cured by heating to a temperature of at least 100° C.

In testing formulations of the present invention, the polyurea and siloxanes (combined weight percent) are maintained constant at 40 wt. % and 20 wt. % respectively. Samples were prepared using 1 wt. % of 15A clay and 10% each of the epoxy and amine terminated silane. To test the formulations, the coatings were applied by solution drop method onto 1"×4"×⅛" Al 2024-T3 and low carbon steel coupons and were cured in a vacuum oven at maximum temperature of 125° C. The thickness of the coatings was maintained at about 120 μm.

The corrosion protection properties were evaluated by using DC polarization and electrochemical impedance spectroscopy. Saturated calomel electrode and a graphite electrode were employed as reference and counter electrode respectively. The samples under study (exposed surface area of 2.8 cm2) were used as a working electrode. The impedance measurements were performed at the open circuit potential, OCP with applied 10 mV sinusoidal perturbations in the frequency range of 10-2-106 Hz with 10 steps per decade. Tafel plots were generated by applying a potential of ±250 mV from the OCP at a scan rate of 2 mV/s. Reference 3000 potentiostat from Gamry equipments, equipped with Gamry framework and Echem Analyst, was used to analyze the results from direct current polarization and electrochemical impedance spectroscopy.

Nicolet 6700 FT-IR instrument equipped with a Smart Orbit ATR accessory with diamond crystal was used to determine the chemical composition of the samples. ATR was performed over a wavenumber range between 4000 cm-1 and 400 cm-1.

Corrosion Testing on Aluminum Alloy

The hybrid coating on Al 2024-T3 was observed from day 1 of exposure to 50 weeks of exposure time. A constant phase element model was used to calculate the values of coatings resistance and capacitance. The impedance at low frequency values (|Z|0.01 HZ) provide the polarization resistance or coatings corrosion resistance and is usually used to compare the corrosion protection efficiency of the coatings. In the hybrid coating system, the corrosion resistance increases with exposure time. Although the self-healing coatings shows improved protection over the neat coating, the corrosion resistance does not increase from the initial values of resistance at the start of the testing. In the developed hybrid coating, there are three regimes of increasing corrosion resistance. In the first regime, the resistance increased sharply up to 20 days of exposure and then the increase in resistance is gradual from 20 days to 130 days and it seems that after 130 days, the value of coating's resistance reaches a plateau. On close inspection of the trend from 130 days to 350 days, the coating's resistance is found to be increasing even after 350 days of exposure.

The decreasing value of coating's capacitance indicates the removal of water from the coating system with exposure time. It also indicates that the coating is throwing some of the water out from the exposed surface.

Corrosion Testing on Low Carbon Steel

The same behavior of increasing coating's resistance is also demonstrated on the coated low carbon steel. The bode plots of coated low carbon steel with exposure time looks like the replica of the coated aluminum alloy. The coating's resistance increases following the same three regimes of increasing resistance and the capacitance decreases with exposure time.

The polarization curves, where potential is scanned ±250 mV from OCP tends to induce more damage than impedance studies where the fluctuation from OCP is only ±10 mV. The dc curves moves towards the lower current density till 16 weeks of exposure and then starts to increase after further exposure time. Even after 30 weeks of exposure the corrosion rate is 10 times lower than the initial corrosion rate after 1 day of exposure.

Thus, the present invention provides a self-healing coating which reduces corrosion on metal surfaces. Further, it contains no volatile organic compounds and provides a suitable replacement for chromium based coating systems.

This has been a description of the present invention, however, the present invention is defined by the appended claims.

What is claimed is:

1. A coating formed from:
   a water-soluble epoxy ester unsaturated resin;
   a water-soluble polyurea;
   an amine terminated siloxane and an epoxy terminated siloxane; and
   a clay.

2. The coating composition claimed in claim 1 wherein said epoxy ester unsaturated resin is a water-soluble, aromatic epoxy ester.

3. The coating composition claimed in claim 2 wherein said epoxy ester unsaturated resin is formed from an aromatic epoxy and an unsaturated fatty acid.

4. The coating composition claimed in claim 3 wherein said fatty acid is a C15 to C18 fatty acid.

5. The coating composition claimed in claim 3 wherein said formulation includes from about 20% to about 50% by weight epoxy ester.

6. The coating composition claimed in claim 5 wherein said coating composition includes from 30-45% by weight epoxy ester.

7. The coating composition claimed in claim 1 wherein said polyurea is a water-soluble, aromatic polyurea.

8. The coating composition claimed in claim 7 wherein said polyurea has a molecular weight of 5,000 to about 20,000 weight avg MW.

9. The coating composition claimed in claim 7 wherein said polyurea has an intrinsic viscosity of 0.05 to about 0.21.

10. The coating composition claimed in claim 1 wherein said coating composition has a ratio by weight of polyester to polyurethane of 30 to 70, to 70 to 30.

11. The coating composition claimed in claim 1 wherein said clay is montmorillonite clay.

12. The coating composition claimed in claim 11 wherein said clay is treated with a quaternary ammonium compound.

13. The coating composition claimed in claim 12 wherein said clay is 15A cloisite.

14. The coating composition claimed in claim 11 wherein the coating compound comprises 0.1% to 5% clay.

15. The coating composition claimed in claim 14 comprising 0.5 to 2.5% clay by weight.

16. The coating composition claimed in claim 1 further comprising a non-volatile organic solvent.

17. The coating composition claimed in claim 16 wherein said non-volatile organic solvent comprises N-Methylpyrrolidone.

18. A metal surface selected from the group consisting of aluminum, aluminum alloys, iron, and steel coated with the composition of claim 1.

\* \* \* \* \*